(12) United States Patent
Tanaka et al.

(10) Patent No.: US 6,292,631 B1
(45) Date of Patent: Sep. 18, 2001

(54) CAMERA AND ITS BATTERY PACK

(75) Inventors: Osamu Tanaka, Hashimoto; Shunji Oku, Takaishi; Kenichi Fujisawa, Izumi; Hidehiko Fujii, Kawachinagano; Toshitsugu Yamamoto, Takatsuki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/393,297

(22) Filed: Sep. 10, 1999

(30) Foreign Application Priority Data

Sep. 11, 1998 (JP) ................................................ 10-258207

(51) Int. Cl.[7] ............................................. G03B 7/26
(52) U.S. Cl. ................................. 396/280; 396/301
(58) Field of Search ................................... 396/301, 302, 396/303, 277, 278, 279, 280; 348/372

(56) References Cited

U.S. PATENT DOCUMENTS

| 4,697,909 | 10/1987 | Machida et al. | ....................... 396/278 |
|---|---|---|---|
| 5,515,134 | * 5/1996 | Taguchi | ................................ 396/301 |
| 5,729,775 | 3/1998 | Ohta et al. | ........................ 396/277 X |

FOREIGN PATENT DOCUMENTS

| 05150310 | 6/1993 | (JP) . |
| 08054671 | 2/1996 | (JP) . |

* cited by examiner

Primary Examiner—W. B. Perkey (57) ABSTRACT

A mechanism, of a camera, for surely resetting a microcomputer at time of switching among a plurality of types of power sources. In the mechanism in which a manual operation dial for switching among the plurality of types of power sources is rotated to slide an electrical contact piece over a predetermined electrically conductive/non-conductive pattern so that a desired power source type is selected, an electric conductivity/non-conductivity between an IC and a negative terminal changes, immediately before an electric power across a positive terminal and the negative terminal is changed from "ON" to "OFF", and immediately after the electric power is changed from "OFF" to "ON". In association with the change, the IC outputs a reset signal to the microcomputer of the camera.

15 Claims, 9 Drawing Sheets

CAMERA AND ITS BATTERY PACK

This application is based upon application No. 10-258207 filed in Japan, the contents of which are hereby incorporated by reference.

BACKGROUND OF THE INVENTION

1. Field of the Invention

The present invention relates to a camera and a battery pack which is removably attached to a camera body of the camera.

2. Description of the Related Art

Conventionally, there has been provided a single-lens reflex camera with a high performance, which is intended to be manufactured particularly for a camera professional and/or an amateur with a high level of photographing skill or technique. In such a single-lens reflex camera, there is a possibility that an unexpected shortage of power supplied from a battery, accommodated in a battery chamber of the camera, may hinder the photographer, or the user, from taking a photograph with the camera. Therefore, in order to prevent such an inconvenience, a separate or independent accessory (i.e. battery pack), for example, which can house a battery having a greater capacity and which can be voluntarily attached to a camera body of the camera, has been conventionally employed. With this arrangement, a plurality of power source systems can be provided.

For instance, U.S. Pat. No. 4,697,909 discloses a camera in which a battery pack, attached to a bottom part of the camera body, houses two kinds of power sources one of which can be selected by a switching member.

On the other hand, Japanese Laid-Open Patent Publication No. 8-54671 discloses a camera in which a separate, or independent, power source pack (or a battery pack), able to be attached to the camera body, can house a plurality of kinds of power sources any one of which can be selected by a switching member.

According to the arrangement, however, an operation to reset the microcomputer inside the camera body, upon the switchover between the power source systems, is not considered at all. The microcomputer for controlling the operation of the camera is operated on the basis of the electric power supplied thereto, and the microcomputer stops its operation when the supply of the electric power from the power source stops. When the electric power is started to be fed to the microcomputer once after the power supply is cut, it is necessary to firstly reset the microcomputer, and then to actuate the microcomputer again. Namely, the microcomputer can not be actuated, or operated, from a state that the software has once been stopped due to the cut of the power supply. Unless the microcomputer is re-actuated, or re-operated, in such a manner, the camera does not operate properly and correctly. Or, unless the microcomputer is re-actuated, or re-operated, in such a manner, even though it seems that the camera operates properly or correctly, the camera may not actually operate properly or correctly.

As the resetting operation, there are two resetting methods. The first resetting method is a resetting method which is executed with respect to a software. In this first resetting method, the software is constructed so that a resetting sequence is performed when the electric supply from a power source is started to the microcomputer.

On the other hand, the second resetting method is a resetting method which is executed mechanically. In this second resetting method, a reset switch (or resetting switch) is mechanically turned on in unison with replacing batteries, or in unison with closing a lid of the battery chamber.

However, according to the first resetting method, the construction of a software becomes complicated because there is a need of linking with other softwares for controlling other operations/functions of the camera. Also, according to the first resetting method, the resetting operation may be unstable, depending upon a condition of the power source of the camera.

Meanwhile, according to the second resetting method, it is possible to reset the microcomputer precisely, independently of the software. However, there is a need of performing a mechanical interlocking operation. Therefore, it is not possible to reset the microcomputer, with a construction in which a power source is selected from a plurality of power sources, for example without replacing a battery with another.

By the way, each of the aforementioned U.S. Pat. No. 4,697,909 and Japanese Laid-Open Patent Publication No. 8-54671, does not disclose the resetting operation of the microcomputer.

SUMMARY OF THE INVENTION

Accordingly, it is an object of the present invention to provide a camera in which a microcomputer is surely and reliably reset at time of selecting one of a plurality of power sources (i.e. at time of switching among a plurality of power sources), and to provide a battery pack which is removably attached to a camera body of the camera.

In accomplishing this and other objects of the present invention, according to one aspect of the present invention, there is provided a camera in which one of a plurality of power sources is selectively employed to supply an electric power to a microcomputer of the camera, the camera comprising: a power source selector for selecting the one of the plurality of power sources; and a resetter for outputting a reset signal to the microcomputer, in linkage with an operation, to select the one of the plurality of power sources, of the power source selector.

According to the mechanism, the reset signal is output from the resetter to the microcomputer, in linkage with the operation of the power source selector. Therefore, the microcomputer is surely and reliably reset at time of selecting the one of the plurality of power sources (i.e. at time of switching among the plurality of power sources).

According to another aspect of the present invention, there is provided a battery pack for a camera, wherein the battery pack is electrically connected to a body of the camera in which the body thereof has a first power source to supply an electric power to a microcomputer of the body, the battery pack comprising: a second power source; a power source selector for selecting one of the first power source and the second power source to supply the electric power to the microcomputer; and a resetter for outputting a reset signal to the microcomputer, in linkage with an operation, to select the one of the first power source and the second power source, of the power source selector.

BRIEF DESCRIPTION OF THE DRAWINGS

This and other objects and features of the present invention will become clear from the following description taken in conjunction with the preferred embodiment there with reference to the accompanying drawings, in which.

DETAILED DESCRIPTION OF THE PREFERRED EMBODIMENT

Before the description of a preferred embodiment of the present invention proceeds, it is to be noted that like or corresponding parts are designated by like reference numerals throughout the accompanying drawings.

Referring to FIGS. 1 through 11, a description is made below upon a camera and a battery pack which is removably attached to a camera body of the camera, according to the preferred embodiment of the present invention.

Firstly, with reference to FIG. 3, the description is made below upon an outline of the camera and the battery pack.

Figure 3:
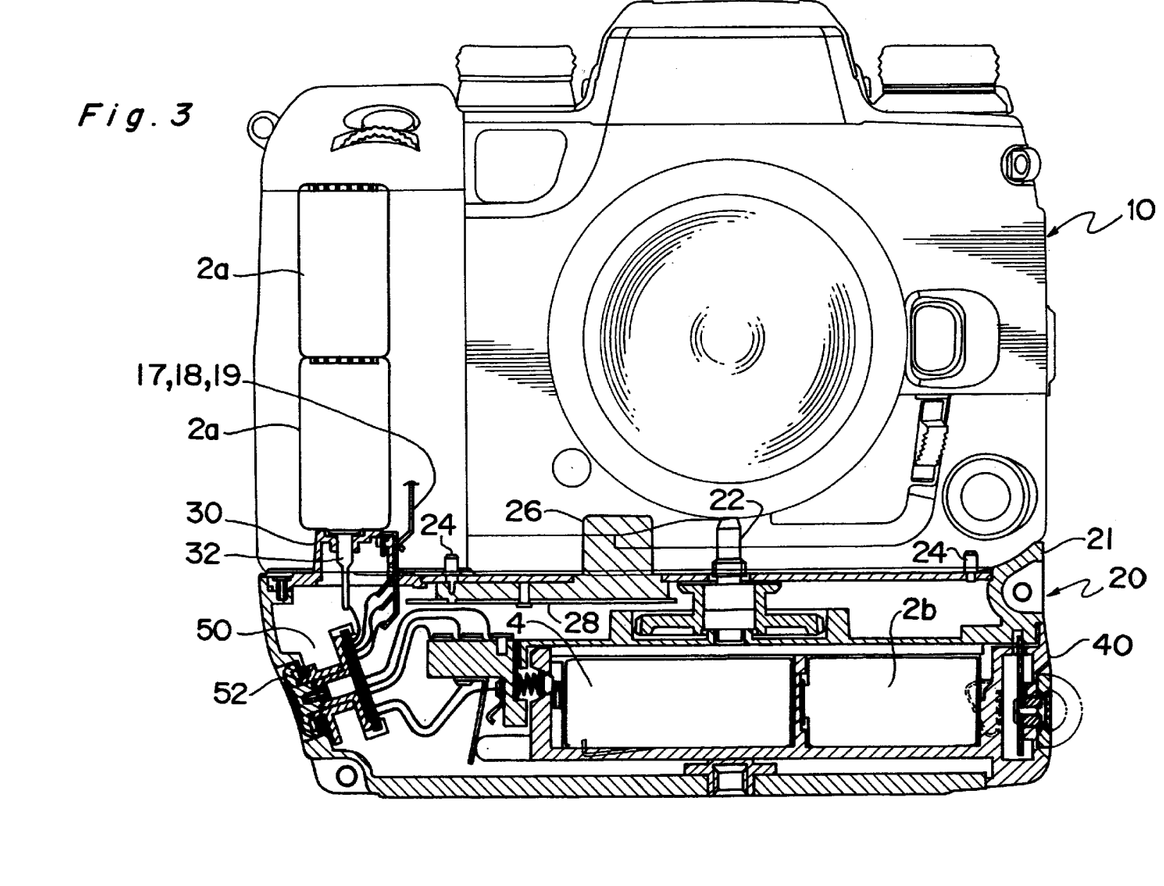
FIG. 3 is a front view showing a state in which the battery pack is attached to the camera body of the camera shown in FIG. 1.

As shown in FIG. 3, the battery pack 20, able to accommodate a plurality of batteries, can be attached to a bottom part of a camera body 10 of the camera. The battery pack 20 has a grip portion to make it easy to hold the camera body vertically for taking pictures of vertical format. Also, the battery pack 20 has a plurality of auxiliary operation members, to be used upon holding the camera body thus vertically, such as a release button, an operation dial, and the like, on the grip portion.

A battery chamber accommodating a pair of CR123A batteries 2a is provided inside a grip portion of the camera body 10. A lid 12 (refer to FIG. 1) of the battery chamber is installed on a bottom portion of the camera body 10.

The battery pack 20 can be connected to the bottom part of the camera body 10 by utilizing a tripod screw hole formed on the bottom part of the camera body, with a state in which the batteries 2a remain accommodated in the battery chamber of the camera body 10. The battery pack 20 is capable of accommodating three types of batteries 2b, 4, 6 (refer to FIGS. 3 and 9 etc.) . It is possible to select any one of the three types of batteries 2b, 4, 6 accommodated inside the battery pack 20, or to select the batteries 2a accommodated inside the battery chamber of the camera body 10, by rotating the operation dial 52 of a power supply switching part 50.

Namely, by rotating the operation dial 52, it is possible to select any one of the power sources 2b, 4, 6, 2a the electric power of which is to be supplied to the camera body 10. In unison with a rotation of the operation dial 52, a reset signal is transmitted to a microcomputer of the camera body 10.

Figure 4:
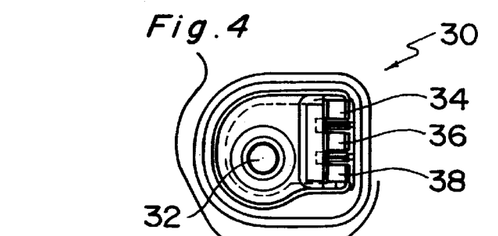
FIG. 4 is a plan view showing a main part of the battery pack.

More specifically, as shown in FIGS. 3 and 4, there are provided, on an upper part of a battery pack body 21 of the battery pack 20, a connecting screw 22 which is able to be screwed into the tripod screw hole formed on the camera body 10; a positioning projection 24 which is able to engage a bottom portion of the camera body 10; a signal terminal 26 which is able to be connected to a signal terminal formed on the bottom portion of the camera body 10; and a power source connecting portion 30 which is able to be inserted into an opening of the battery chamber, instead of the lid 12 of the battery chamber being inserted thereinto.

As shown in FIG. 4, the power source connecting portion 30 has a pin 32 for the battery accommodated inside the camera body 10 at its central part; a negative electrode contact piece 34 on one side thereof; a positive electrode contact piece 36 on the one side; and a reset contact piece 38 at the one side. The pin 32 contacts with a positive electrode of the battery 2a which is loaded inside the battery chamber of the camera body 10. The negative electrode contact piece 34, the positive electrode contact piece 36, and the reset contact piece 38, contact connection terminals 17, 18, 19 (only one of them is shown in FIG. 3) provided on a side of the camera body 10, respectively, so as to electrically connect the camera body 10 and the battery pack 20 with each other.

As shown in FIG. 3, the battery pack 20 houses: a communication control substrate 28 which is connected to the auxiliary operation members of the battery pack 20, and which is connected to the signal terminal 26, with a state in which the communication control substrate 28 is positioned therebetween; a battery holder 40 accommodating the batteries 2b, 4, 6; and the power supply switching part 50.

The battery holder 40 can be removed from a battery pack body 21 of the battery pack 20 by pulling out the battery holder 40 from the battery pack body 21. On the other hand, the battery holder 40 can be attached inside the battery pack body 21 by engaging a locking claw 46 of the battery holder 40 with the battery pack body 21 (refer to FIG. 5).

Figure 9:
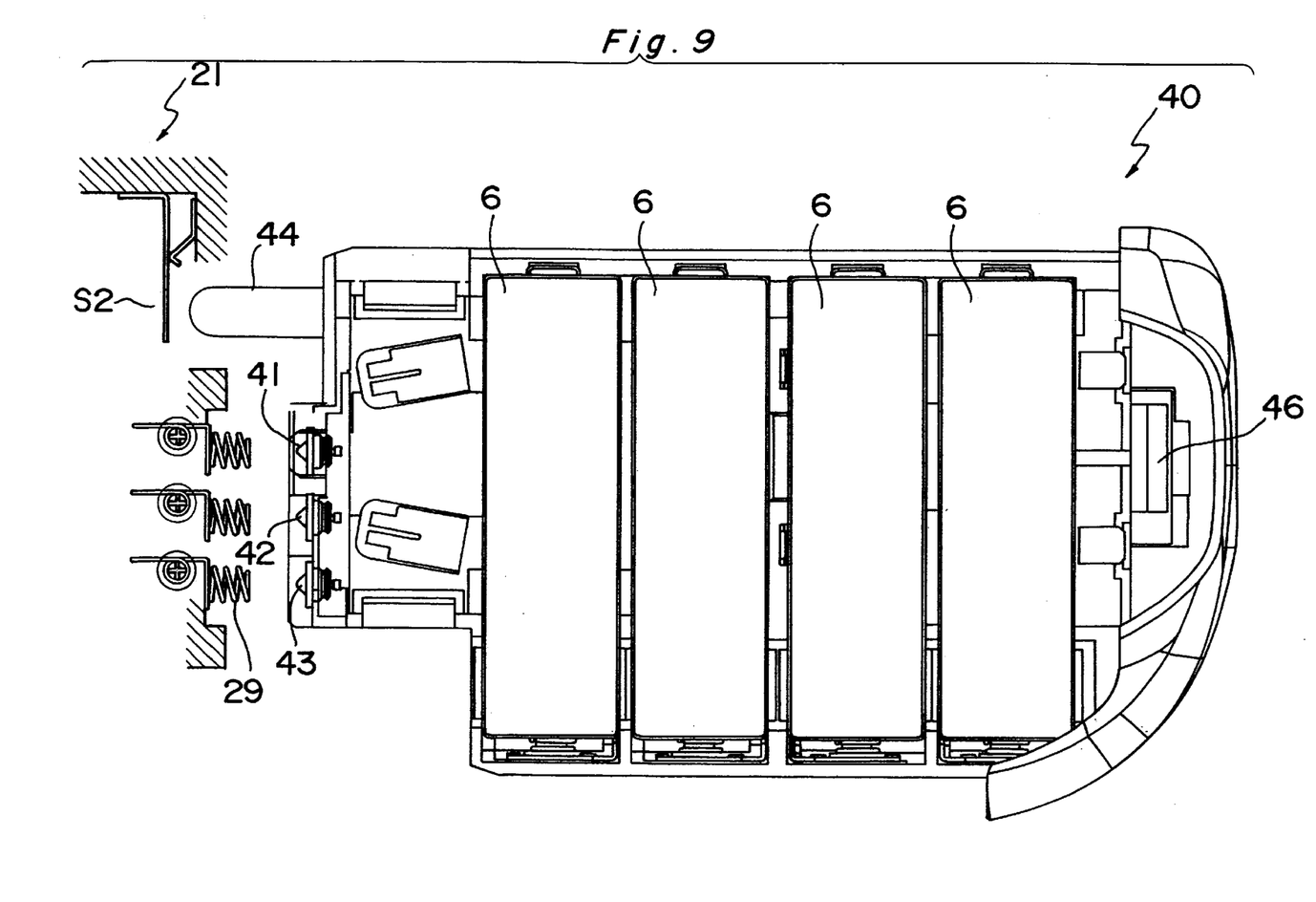
FIG. 9 is a plan view showing a battery holder which is accommodated inside a battery pack body of the battery pack.
Figure 10:
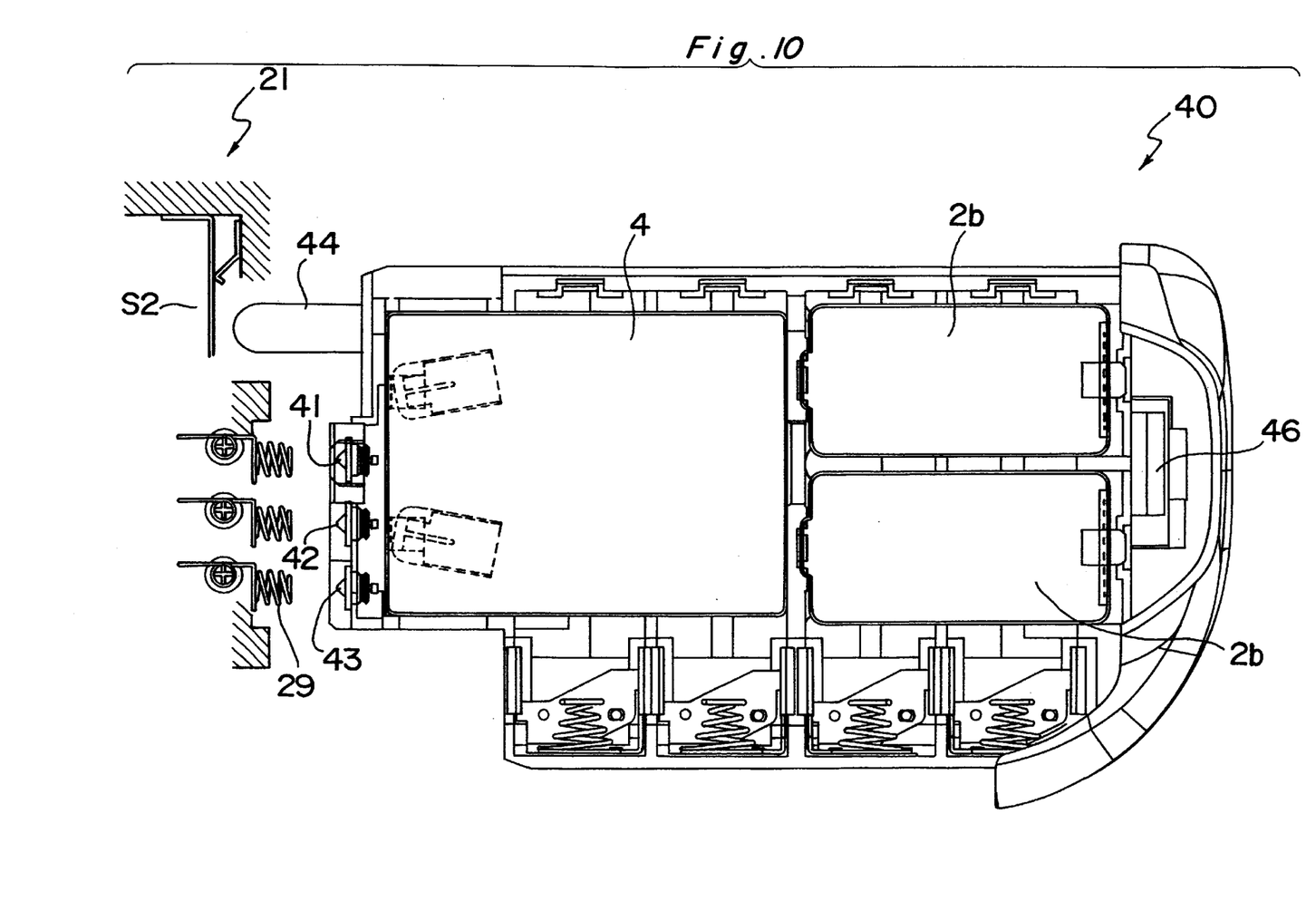
FIG. 10 is a plan view showing the battery holder.

As shown in FIG. 9, the battery holder 40 can accommodate four AA size or LR6 batteries 6 therein. Further, as shown in FIG. 10, the battery holder 40 can accommodate one 2CR5 battery 4 and a pair of CR123A batteries 2b therein, at the same time.

The battery holder 40 has three kinds of electrode terminals.

That is, the battery holder 40 has a first positive electrode terminal 41 which is connected to the positive electrodes of the four AA size batteries 6 and to the positive electrodes of the pair of CR123A batteries 2b when the four AA size batteries 6 and the pair of CR123A batteries 2b are put inside the battery holder 40; a second positive electrode terminal 42 which is connected to the positive electrode of the one 2CR5 battery 4 when the 2CR5 battery 4 is put inside the battery holder 40; and a negative electrode terminal 43 which is connected commonly to the negative electrodes of the CR123A batteries 2b, the 2CR5 battery 4, and the AA size batteries 6 when any one(s) of the batteries is/are put inside the battery holder 40.

When the battery holder 40 is set inside the battery pack body 21 by inserting the former into the latter, each of the electrodes 41, 42, 43 respectively contact a corresponding connection spring 29 which is provided inside the battery pack body 21. With the arrangement, each of the electrodes 41, 42, 43 is respectively electrically connected to the power supply switching part 50.

Figure 2:
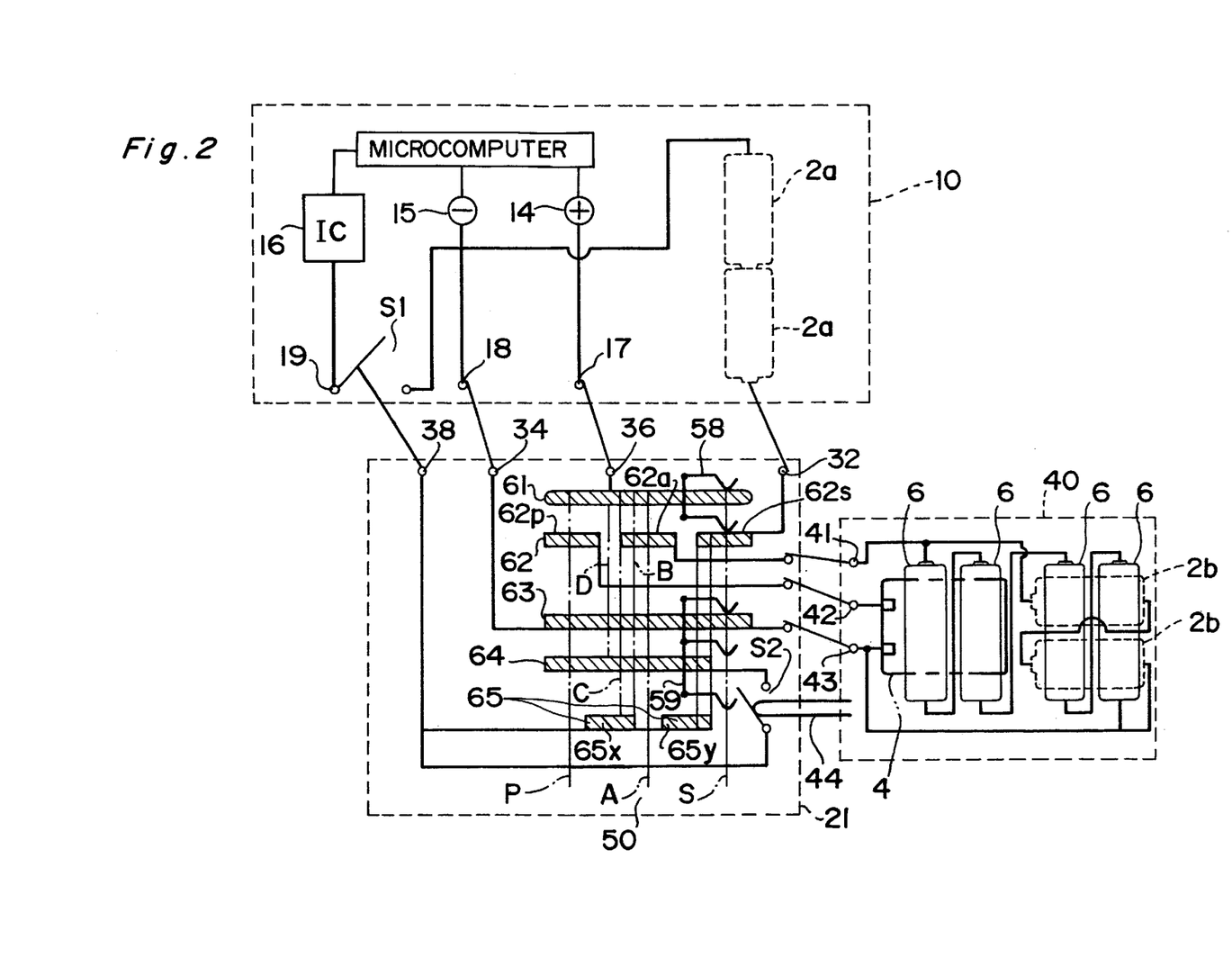
FIG. 2 shows a construction of a basic circuit which is formed when a battery pack according to the preferred embodiment thereof is attached to a camera body of the camera of FIG. 1.

The battery holder 40 also has an electrically unconductive projection 44 which opens a battery holder switch S2 mounted on the battery pack body 21 when the battery holder 40 is put inside the battery pack body 21 by inserting the former into the latter (refer to FIGS. 2 and 9).

Figure 5:
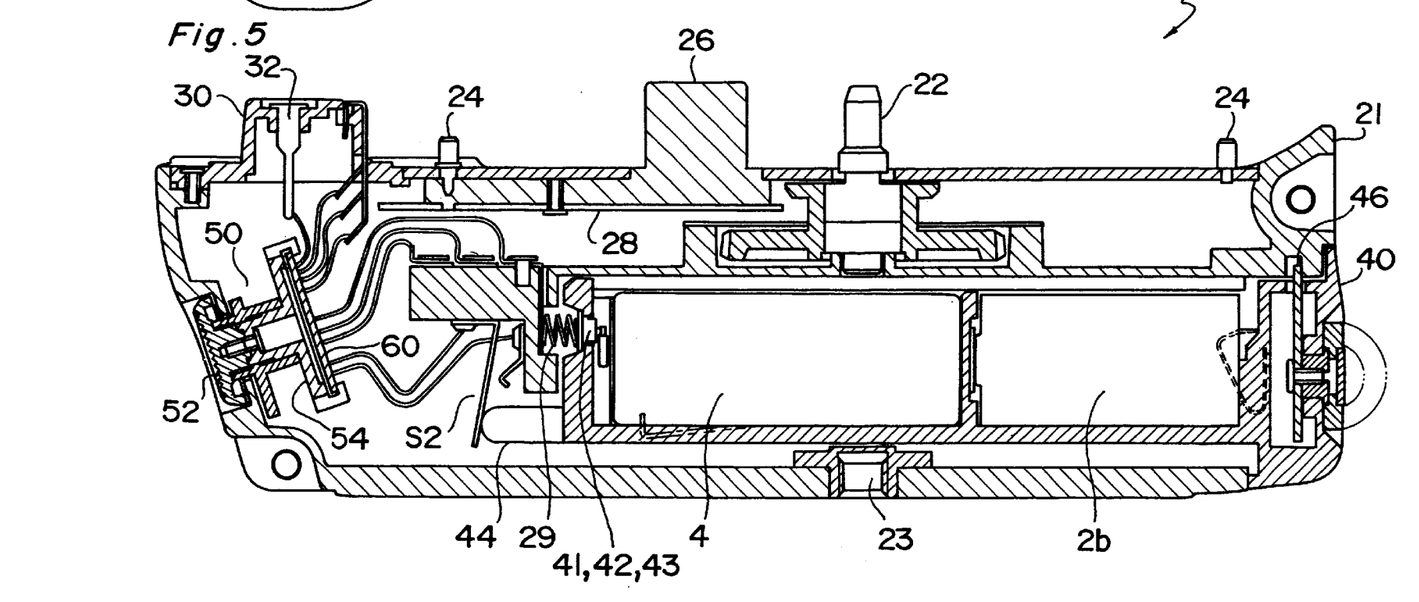
FIG. 5 is a sectional view showing the battery pack.
Figure 6:
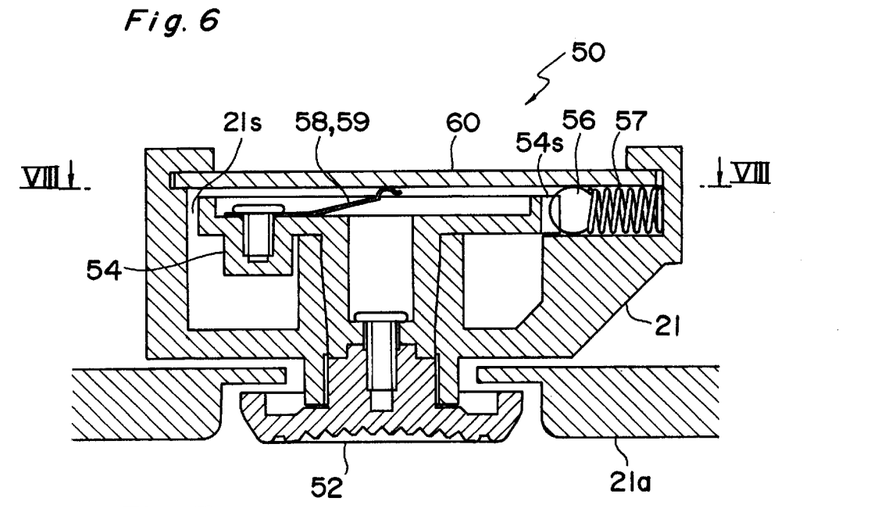
FIG. 6 is an enlarged sectional view showing a main part of the battery pack.

As shown in FIGS. 5 and 6, the power supply switching part 50 has the operation dial 52, a rotation ring 54, and a pattern substrate 60.

The operation dial 52 is rotatably supported on the battery pack body 21, and it is exposed on the outside of the battery pack body 21, so that the operation dial 52 can be manually manipulated, or rotated, from outside.

Figure 7:
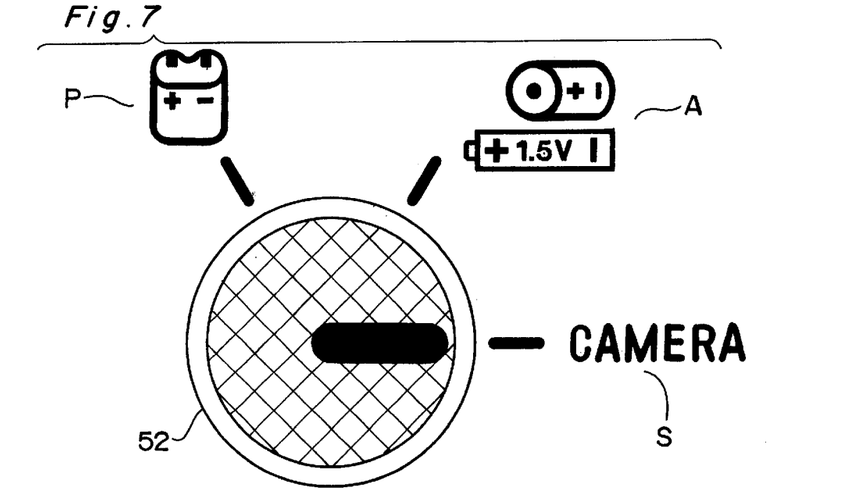
FIG. 7 is an enlarged side view showing a main part of the battery pack.

As shown in FIG. 7, three power source selection positions (or three power supply selection positions) "A", "P", "S" are displayed on an outer surface 21*a* of the battery pack body 21 relative to a rotation of the operation dial 52 with an indicia. With the arrangement, any one of the batteries 2*a*, 2*b*, 4, 6 can be selected to supply the electric power to the camera body 10, in compliance with a rotation angle of the operation dial 52. By the way, as explained in more detail later, a power source selection position "s" is referred to as a first position; a power source selection position "A" is referred to as a second position; and a power source selection position "P" is referred to as a third position.

A rotation ring 54 is positioned in a housing space 21*s* (see FIG. 6) which is formed inside the battery pack body 21, and it is connected to the operation dial 52 so that the rotation ring 54 is rotated together with the rotation of the operation dial 52.

Figure 8:
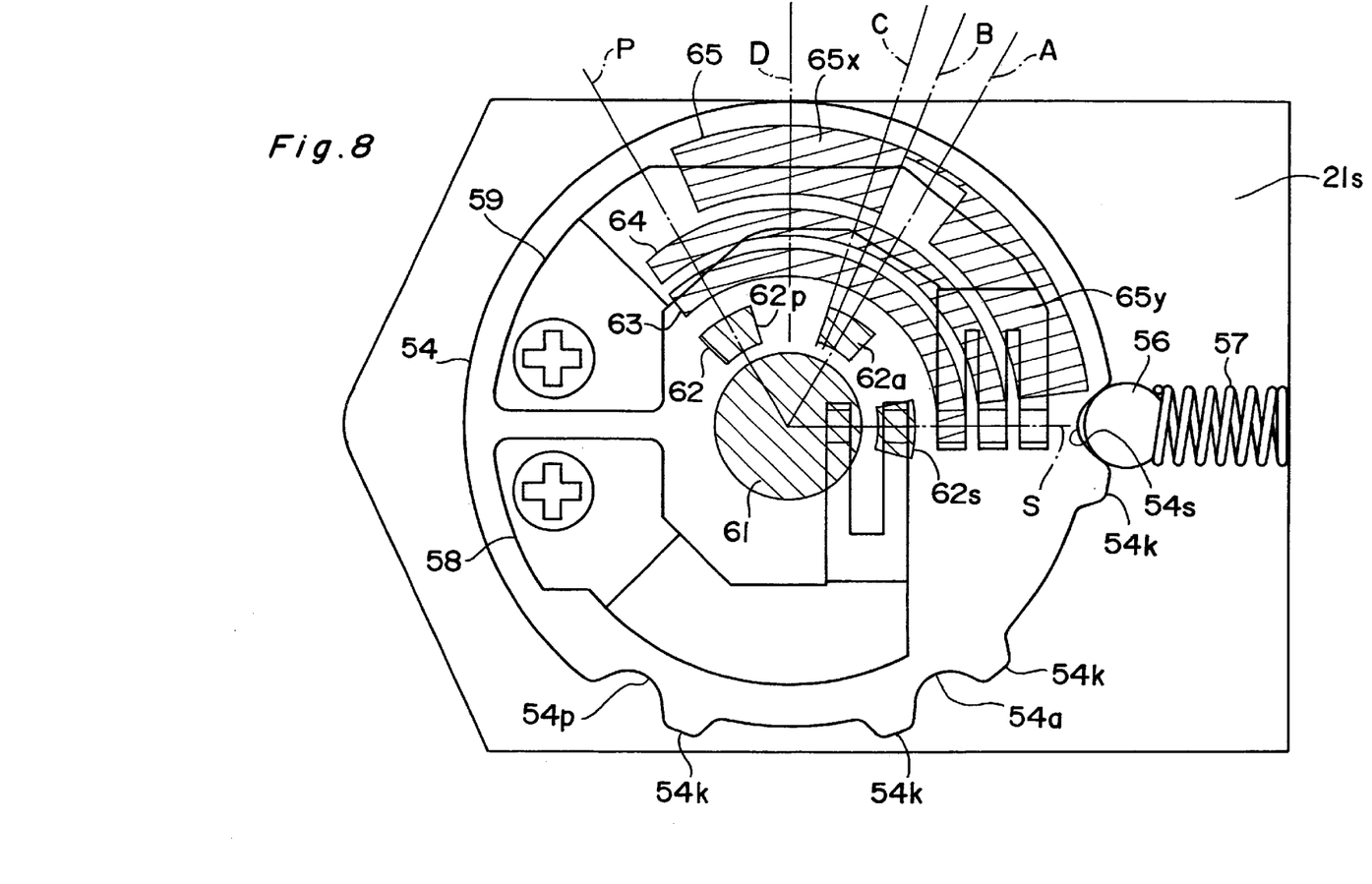
FIG. 8 shows an internal construction of a power supply switching part of the battery pack.

As shown in FIGS. 6 and 8, three click grooves 54*a*, 54*p*, 54*s*, respectively corresponding to the power source selection positions "A", "P" and "S" are formed on a peripheral surface (or circumferential edge part) of the rotation ring 54. A click ball 56 is biased towards the peripheral surface of the rotation ring 54 by a spring 57, so that the rotational position of the operation dial 52 is reliably set relative to any one of the power source selection positions "A", "P" and "S".

A power source contact piece 58 and a reset signal contact piece 59 are fixed to the rotation ring 54, as shown in FIG. 6. In the arrangement, the power source contact piece 58 and the reset signal contact piece 59 slidingly contact a plurality of patterns 61–65 formed on a pattern substrate 60, which will be described in more detail later.

The pattern substrate 60 is fixed to the battery pack body 21, with a state in which the pattern substrate 60 faces the rotation ring 54. As shown in FIG. 8, the pattern substrate 60 has a center pattern 61, a power source selection pattern 62 (i.e. 62*s*, 62*a* and 62*p*); a ground pattern 63, a body battery checking pattern (or a body battery confirmation pattern) 64, and a reset pattern 65. Each pattern thereof is concentrically arranged relative to an axis of the rotation ring 54.

In FIG. 8, hatched portions indicate electrically conductive portions. As shown in the figure, the power source contact piece 58 slidingly contacts the center pattern 61 and the power source selection pattern 62. On the other hand, the reset signal contact piece 59 slidingly contacts the ground pattern 63, the body battery checking pattern 64, and the reset pattern 65.

With reference to FIGS. 2 and 8, it is explained about a power supply switching part.

That is, the center pattern 61 is constituted by a circular electrically conductive portion.

The power source selection pattern 62 has three electrically conductive portions 62*a*, 62*p*, 62*s* which are intermittently arranged, in a shape of a circular arc, with an insulation portion interposed between a pair of adjacent electrically conductive portions 62*p*, 62*a* and between a pair of adjacent electrically conductive portions 62*a* and 62*s*. Of the three electrically conductive portions 62*a*, 62*p*, 62*s*, the electrically conductive portion 62*p* is the portion for the 2CR5 battery 4, and the electrically conductive portion 62*p* is connected to the second positive electrode terminal 42 of the battery holder 40; the electrically conductive portion 62*a* is the portion for the AA size battery 6 and the CR123A battery 2*b*, and the electrically conductive portion 62*a* is connected to the first positive electrode terminal 41 of the battery holder 40; and the electrically conductive portion 62*s* is the portion for the battery 2*a* which is accommodated inside the camera body 10, the electrically conductive portion 62*s* is connected to the pin (or camera body battery pin) 32 of the power source connecting portion 30 of the battery pack 20.

The ground pattern 63 has a continuous, circular arc-shaped electrically conductive portion which overlaps, or corresponds to, the electrically conductive portions 62*a*, 62*p*, 62*s* of the power source selection pattern 62 and which overlaps, or corresponds to, the insulation portion between the pair of adjacent electrically conductive portions 62*a*, 62*p* and the insulation portion between the pair of adjacent electrically conductive portions 62*a* and 62*s*, when it is seen from a radial direction. The ground pattern 63 is connected to the negative electrode terminal 43 of the battery holder 40.

The camera body battery checking pattern 64 has a continuous, circular arc-shaped electrically conductive portion which overlaps, or corresponds to, the electrically conductive portions 62*a*, 62*p* (except 62*s*) of the power source selection pattern 62 and which corresponds to the insulation portion between the pair of adjacent electrically conductive portions 62*a*, 62*p* and the insulation portion between the pair of adjacent electrically conductive portions 62*a*, 62*s*, when it is seen from the radial direction. In the arrangement, when it is seen from the radial direction, the continuous, circular arc-shaped electrically conductive portion of the camera body battery checking pattern 64 extends, or projects, so as to circumferentially (i.e. in a direction of its circumference) overlap, or correspond to, a part of the electrically conductive portion for camera body battery 62*s*; and the camera body battery checking pattern 64 further has an insulation portion which is adjacent to a part, of the continuous circular arc-shaped electrically conductive portion of the pattern 64, which corresponds to the above part of the electrically conductive portion for camera body battery 62*s*, as shown in FIGS. 2 and 8. The camera body battery checking pattern 64 is connected to the reset contact piece 38 of the power source connecting portion 30 of the battery pack 20 via the battery holder switch S2.

The reset pattern 65 has a pair of electrically conductive portions 65*x*, 65*y*, each of which overlaps, or corresponds to, the insulation portion between the pair of adjacent electrically conductive portions 62*a*, 62*p* of the power source selection pattern 62 and the insulation portion between the pair of adjacent electrically conductive portions 62*a*, 62*s*, when it is seen from the radial direction. In the arrangement, when it is seen from the radial direction, the electrically conductive portion 65*x* projects, or extends, partially, with respect to both of the adjacent electrically conductive portions 62*a*, 62*p* of the power source selection pattern 62 circumferentially (or in its circumferential direction); meanwhile, the electrically conductive portion 65*y* projects, or extends, partially, with respect to both of the adjacent electrically conductive portions 62*a*, 62*s* circumferentially. Also, in the arrangement, when it is seen from the radial direction, the reset pattern 65 has an insulation portion which generally overlaps, or corresponds to, the electrically conductive portions 62p, 62a, 62s of the power source selection pattern 62 circumferentially. The reset pattern 65 is connected to the reset contact piece 38 of the power source connecting portion 30 of the battery pack 20.

Next, it is explained about an operation of the camera.

That is, the camera can be operated, only with a power supply from the two CR123A batteries 2a which are accommodated in the camera body 10. On the other hand, when the battery pack 20 is connected to the camera body 10, it is possible to selectively supply the electric power to the camera body 10 from the pair of CR123A batteries 2a which are accommodated therein, or from a combination of the batteries 2b, 6 which are accommodated inside the battery holder 40 of the battery pack 20, or from the battery 4 which is accommodated inside the battery holder 40.

Upon switching from one type of power source (or power supply) to another type thereof, a reset signal is transmitted to the microcomputer which controls the operation of the camera. According to the arrangement, upon receiving the reset signal, the microcomputer operates reliably and stably.

Figure 1:
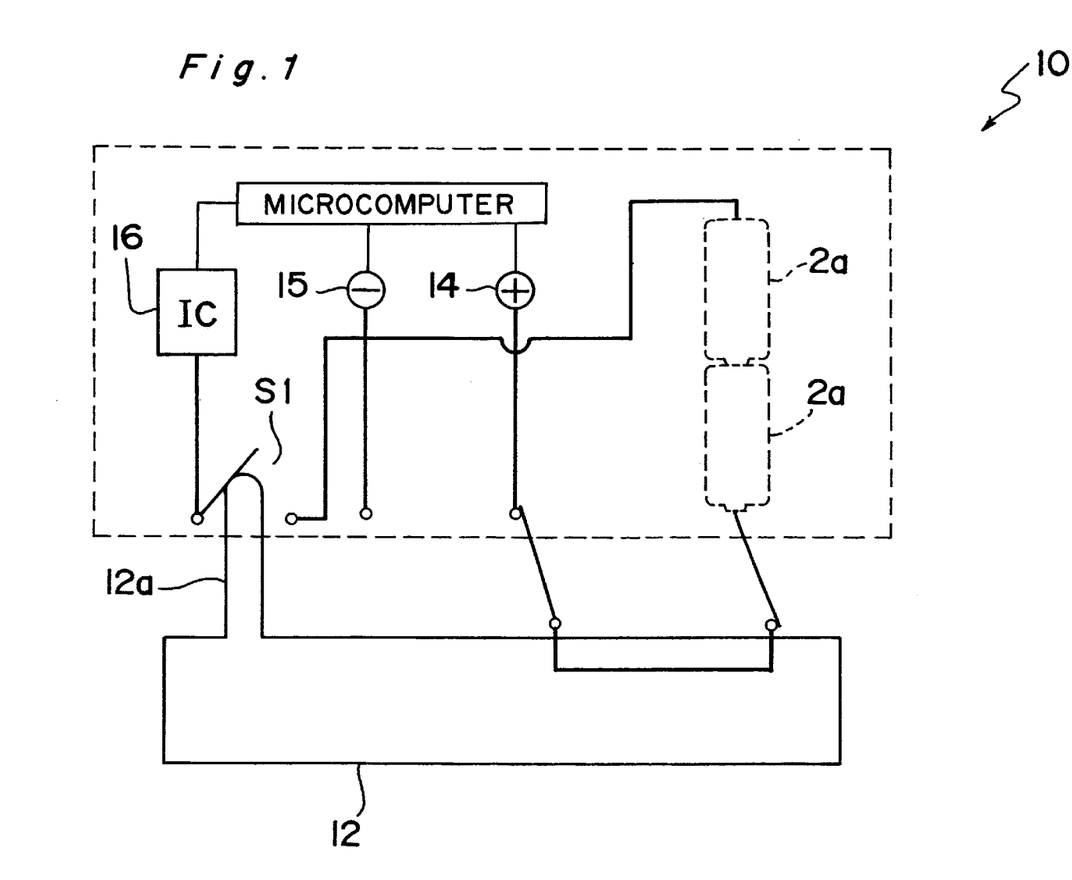
FIG. 1 shows a construction of a basic circuit of a camera according to a preferred embodiment of the present invention.

Firstly, with reference to FIG. 1, it is explained about the operation of the camera, in case that the battery pack 20 is not connected to the camera body 10.

That is, the microcomputer of the camera body 10 is actuated by supplying the electric power to a positive terminal 14 and a negative terminal 15, respectively. An IC 16 transmits a reset signal to the microcomputer in association with opening and closing of a body reset switch S1, namely in association with a change from opening to closing thereof, or from a change from closing to opening thereof. The body reset switch S1 is mechanically constructed such that it is opened and closed by the opening and closing of the lid 12 of the battery chamber of the camera body 10.

That is, when the lid 12 of the battery chamber starts to be closed with the battery 2a being accommodated in the battery chamber of the camera body 10, the positive terminal 14 and the negative terminal 15 are connected to both electrodes of the batteries 2a therein. As a result, the electric power is supplied to the microcomputer of the camera body 10 from both the positive terminal 14 and the negative terminal 15. At this time, the body reset switch S1 remains closed.

As the lid 12 of the battery chamber is further closed, the body reset switch S1 is opened by an electrically unconductive projection 12a of the lid 12 of the battery chamber. In association with the opening of the body reset switch S1, the IC 16 outputs the reset signal to the microcomputer.

On the other hand, when the lid 12 of the battery chamber starts to be opened, the body reset switch S1 is first closed. In association with the closing of the body reset switch S1, the IC 16 outputs the reset signal to the microcomputer. At this time, the electric power is continuously supplied to the microcomputer of the camera body 10 through both the positive terminal 14 and the negative terminal 15. Upon receipt of the reset signal, the microcomputer executes a termination program.

As the lid 12 of the battery chamber is further opened, the positive terminal 14 and the negative terminal 15 are disconnected from both electrodes of the battery 2a accommodated in the battery chamber. That is, the supply of the electric power to the microcomputer stops. By this time, the microcomputer have already finished the execution of the termination program. Therefore, the operation of the camera can start reliably and safely when the electric supply from the power source to the microcomputer is resumed.

Next, with reference to FIG. 2 showing a basic construction circuit, it is explained about the operation of the camera, in case that the battery pack 20 is connected to the camera body 10.

That is, when the battery pack 20 is attached to the camera body 10, the positive electrode of the battery 2a in the battery chamber is electrically connected to the electrically conductive portion 62S of the power source selection pattern 62 of the power supply switching part 50 inside the battery pack 20, through the pin 32 of the power source connecting portion 30 of the battery pack 20.

The positive electrode contact piece 36, the negative electrode contact piece 34, and the reset contact piece 38 of the power source connecting portion 30 of the battery pack 20, are connected to the positive terminal 14, the negative terminal 15, and the IC 16 of the camera body 10, respectively, through the connection terminals 17, 18, 19 of the camera body 10. The reset contact piece 38 opens the body reset switch S1.

When the operation dial 52 of the power supply switching part 50 of the battery pack 20 is manually operated, the IC 16 is electrically conductive/unconductive with respect to the negative terminal 15, thus transmitting the reset signal to the microcomputer.

Figure 11:
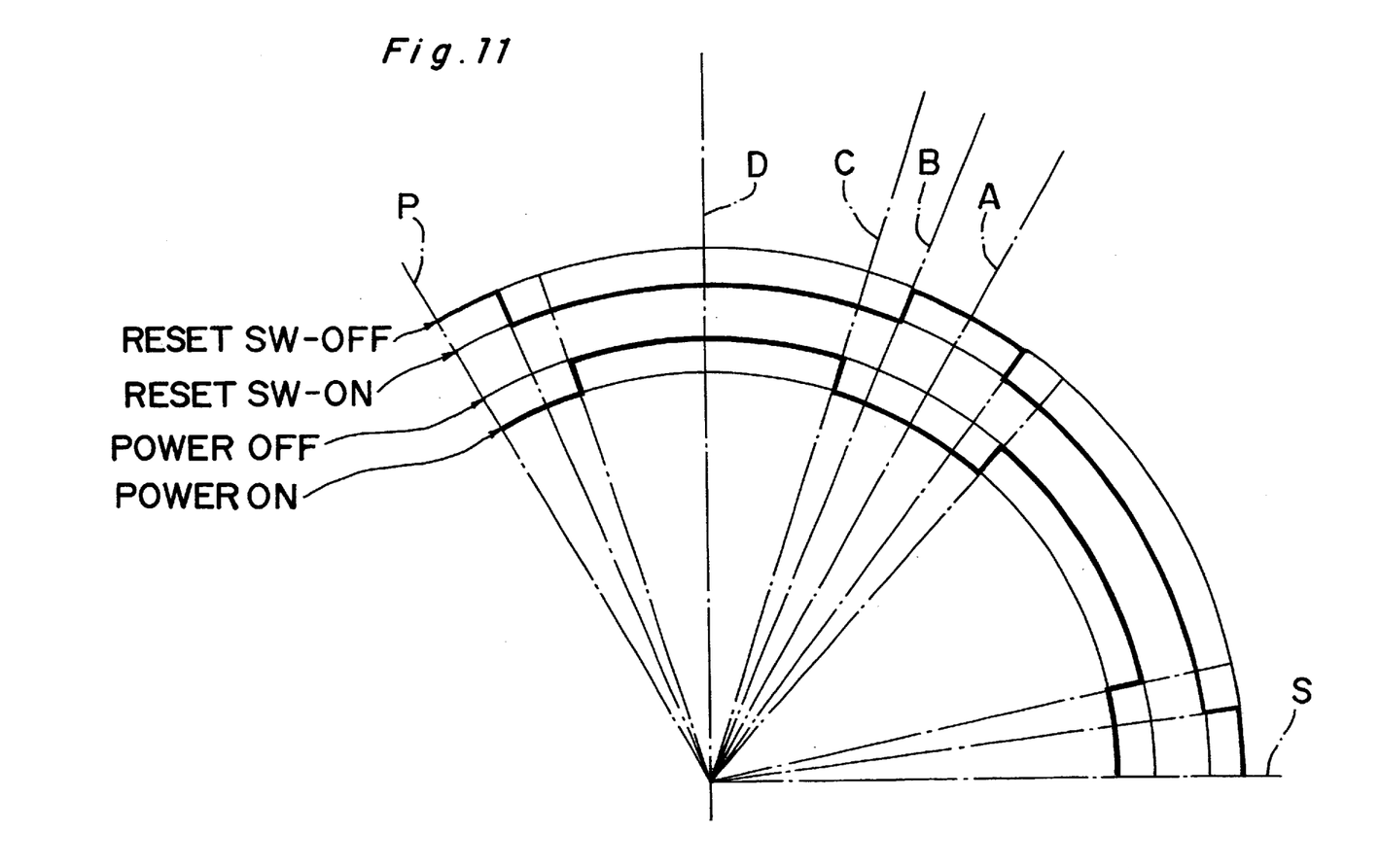
FIG. 11 is a timing chart showing a switchover among a plurality of power sources.

More specifically, for example, when the operation dial 52 is located at the first position "S" (i.e. a position of "CAMERA" in FIG. 7), as shown in FIGS. 2 and 8, the power source contact piece 58 is electrically conductive with both the center pattern 61 and the electrically conductive portion 62S for camera body battery of the power source selection pattern 62. As a result, the electric power is supplied to the microcomputer from the battery 2a inside the camera body 10. At this time, the reset signal contact piece 59 is connected to the ground pattern 63, but it is electrically disconnected relative to the camera body battery checking pattern 64 and relative to the reset pattern 65. Therefore, the IC 16 of the camera body 10 and the negative terminal 15 thereof are not electrically conductive (or not electrically connected) to each other. Accordingly, as shown in FIG. 11 illustrating a timing chart, a body reset switch which is constructed between the IC 16 and the negative terminal 15 is "OFF", and the power source across the terminals 14, 15 of the camera body 10 is "ON".

In other words, it is possible to give the battery pack 20 only a function to let the camera be gripped by the user (or photographer) vertically. That is, the camera can operate so long as the battery 2a is loaded inside the camera body 10; namely, the camera can operate even if the battery is not loaded inside the battery pack 20. Therefore, it is possible to employ the battery pack 20 as a vertically gripping member or device.

According to the arrangement, it does not incur increase of weight of the camera due to a large number of batteries.

Meanwhile, when the operation dial 52 is located at the second position "A" (refer to FIG. 7), the power source contact piece 58 is electrically conductive (i.e. connected) with both the center pattern 61 and the electrically conductive portion 62a for both the AA size battery 6 and the CR123A battery 2b of the power source selection pattern 62. Thus, the electric power is supplied to the microcomputer of the camera body 10 from the four AA size batteries 6 which are accommodated in the battery pack 20, and/or from the pair of CR123A batteries 2b which are also accommodated therein. In this condition, the reset signal contact piece 59 is electrically connected to the ground pattern 63 and the camera body battery checking pattern 64. However, the battery holder switch S2 is opened by the electrically unconductive projection 44 of the battery holder 40. Therefore, the IC 16 of the camera body 10 and the negative terminal 15 thereof are not electrically conductive with each other. Accordingly, as shown in FIG. 11, the body reset switch which is constructed between the IC 16 and the negative terminal 15 is "OFF", and the power source across the terminals 14, 15 of the camera body 10 is "ON".

When the operation dial 52 is rotated from the second position "A" to the third position "P" (refer to FIG. 7), the reset signal is transmitted to the microcomputer, immediately before and after the power source is switched between "ON" and "OFF", as shown in FIG. 11.

That is, when the operation dial 52 is started to be rotated from the second position "A" towards the third position "P", firstly, at a position shown by "B" in FIGS. 2 and 11, the reset signal contact piece 59 is electrically conductive with both the electrically conductive portion 65x of the reset pattern 65 and the ground pattern 63. Consequently, the IC 16 is electrically connected to the negative terminal 15. Thus, as shown in FIG. 11, the body reset switch being constructed between the IC 16 and the negative terminal 15 changes from "OFF" to "ON", and the IC 16 outputs the reset signal to the microcomputer. At this time, the power source across the positive terminal 14 of the camera body 10 and the negative terminal 15 thereof remains "ON". Thus, upon receipt of the reset signal, the microcomputer executes a termination routine.

Then, at a position shown by "C" (refer to FIGS. 2 and 11), the power source contact piece 58 is electrically disconnected with respect to the electrically conductive portion 62a for the AA size battery 6 and the CR123A battery 2b of the power source selection pattern 62. Consequently, the electric supply of the power source from the AA size battery 6 or the CR123A battery 2b is cut. Thus, as shown in FIG. 11, the body reset switch between the IC 16 and the negative terminal 15 remains "ON", and the power source across the positive terminal 14 of the camera body 10 and the negative terminal 15 thereof changes from "ON" to "OFF". Thus, the microcomputer stops its operation.

When the operation dial 52 is further rotated to a position "D" which is closer to the third position "P", the supply of the power source still remains stopped.

When the operation dial 52 is further rotated, the power source contact piece 58 is electrically conductive with both the electrically conductive portion 62P for the 2CR5 battery of the power source selection pattern 62 and the center pattern 61. Consequently, as shown in FIG. 11, the power source changes from "OFF" to "ON", and the electric supply of the power source from the 2CR5 battery 4 to the camera body 10 starts. Thus, the microcomputer starts to operate.

When the operation dial 52 is further rotated, the reset signal contact piece 59 passes the electrically conductive portion 65x of the reset pattern 65, and it reaches the insulation portion thereof. As a result, the IC 16 and the negative terminal 15 are electrically disconnected from each other, and the reset switch changes from "ON" to "OFF", as shown in FIG. 11. Thus, the IC 16 outputs the reset signal to the microcomputer. Upon receipt of the reset signal, the microcomputer executes an initialization routine.

When the operation dial 52 reaches the third position "P", the 2CR5 battery 4 keeps supplying its electric power to the camera body 10.

On the other hand, when the battery holder 40 is started to be pulled out of the battery pack body 21, while the operation dial 52 is positioned at the second position "A" or at the third position "P" and while the IC 16 and the negative terminal 15 are electrically disconnected from each other, the battery holder switch S2 which has been opened by the pressing force of the electrically unconductive projection 44 of the battery holder 40 is started to be retracted, and then the battery holder switch S2 is closed. As a result, the IC 16 is electrically connected to the negative terminal 15; the IC 16 outputs the reset signal to the microcomputer, and then the microcomputer executes the termination routine upon receipt of the reset signal from the IC 16.

When the battery holder 40 is further pulled out of the battery pack body 21, the terminals 41, 42, 43 of the battery holder 40 are electrically disconnected from the power supply switching part 50. Thus, the electric supply of the power source to the camera body 10 is stopped, and the microcomputer stops its operation.

On the other hand, when the battery holder 40 is inserted into the battery pack body 21, the electric supply of the power source is firstly started and the microcomputer starts to operate. Next, the reset signal is output to the microcomputer, and then the microcomputer executes its initialization routine.

Meanwhile, when the electric power is supplied to the camera body 10 from the pair of CR123A batteries 2a accommodated in the battery chamber of the camera body 10 with the operation dial 52 being positioned at the first position "S", the reset signal contact piece 59 is electrically unconductive with both the camera body battery checking pattern 64 and the electrically conductive portion of the reset pattern 65. Therefore, even if the battery holder switch S2 is closed by drawing the battery holder 40 out of the battery pack body 21, the IC 16 and the negative terminal 15 remain electrically unconductive with each other. At this time, the IC 16 does not output the reset signal to the microcomputer. Therefore, while the batteries 2a of the camera body 10 are employed, it is possible to replace the battery/batteries 2b, 4, 6 accommodated in the battery pack 20 with new one(s), or to add any one(s) of the battery/batteries 2b, 4, 6 into the battery pack 20, without any problem.

By the way, when the operation dial 52 advances to a region in which the electrically conductive portion 62a, 62p, 62s of the power source selection pattern 62 overlaps the electrically conductive portion 65x, 65y of the reset pattern 65 in the radial direction about a center of the center pattern 61, the microcomputer is reset while the electric supply from the power source continues.

If the operation dial 52, however, remains stationary in such a pattern-overlapping region, the corresponding battery/batteries is/are consumed without operation of the camera. In order to prevent such an inconvenience from occurring, a pair of projections 54k are formed on both sides of each of the click grooves 54s, 54a, 54p, respectively, of the rotation ring 54.

With the construction, the operation dial 54 is prevented from positioning in the pattern-overlapping region.

According to the preferred embodiment, the microcomputer is reset surely and reliably, because the reset signal is transmitted to the microcomputer immediately before and after the power source is switched from one to another.

Also, according to the preferred embodiment, the battery/batteries housed on a side of the battery pack 20 or the batteries housed on a side of the camera body 10 is/are selectively employed. Namely, the batteries housed on the side of the camera body 10 can be employed, with a state in which the battery pack 20 is connected to the camera body 10. This means that it is possible to employ more power sources for the camera. Therefore, with the arrangement, it is possible to keep using the camera for a longer time at one time.

Also, according to the preferred embodiment, the battery pack houses a plurality of different types of batteries (i.e. a plurality of different types of power sources). Therefore, with the arrangement, it is possible to widen a selection range for the power sources.

Also, according to the preferred embodiment, the battery holder in the battery pack has a battery compartment inside which any one(s) of the three types of the batteries can be selectively accommodated. In other words, with the arrangement, it is possible to accommodate more types of batteries inside the battery holder.

Also, according to the preferred embodiment, the power supply switching part, as a power source selector, is constructed as a rotary switch. Therefore, with the arrangement, it is possible to simplify the switching mechanism itself.

Also, according to the preferred embodiment, the IC 16, as a resetter, outputs the reset signal to the microcomputer, after the electric power is supplied to the microcomputer, and before the electric power is stopped to be supplied to the microcomputer, by operating the power supply switching part 50. In other words, with the arrangement, the electric power to the microcomputer is cut only after the microcomputer is reset; on the other hand, the microcomputer is reset only after the electric power to the microcomputer is started. Therefore, with the arrangement, the microcomputer can execute its resetting operation more reliably.

Although the present invention has been fully described in connection with the preferred embodiment thereof with reference to the accompanying drawings, it is to be noted that various changes and modifications are apparent to those skilled in the art.

For example, the battery pack is not limited to the one which is removably attached to the camera body. Namely, the battery pack may be designed as one which is separately provided apart from the camera body in which the battery pack is electrically connected to the camera body through an electric cable or wire.

Such changes and modifications are to be understood as included within the scope of the present invention as defined by the appended claims unless they depart therefrom.

What is claimed is:

1. A camera in which one of a plurality of power sources is selectively employed to supply an electric power to a microcomputer of the camera, the camera comprising:
   a power source selector for selecting the one of the plurality of power sources; and
   a resetter for outputting a reset signal to the microcomputer, in linkage with an operation, to select the one of the plurality of power sources, of the power source selector.

2. The camera as claimed in claim 1, wherein the plurality of power sources are:
   a first power source which is provided inside a body of the camera; and
   a second power source which is provided inside a power source attachment that is electrically connected to the body of the camera,
   wherein the power source selector selects the one of the first power source and the second power source.

3. The camera as claimed in claim 1, wherein the plurality of power sources are:
   a first power source which is provided inside a body of the camera;
   a second power source which is provided inside a power source attachment that is electrically connected to the body of the camera; and
   a third power source which is provided inside the power source attachment that is electrically connected thereto,
   wherein the power source selector selects the one of the first power source, the second power source and the third power source.

4. The camera as claimed in claim 3, wherein the first power source comprises at least one battery of first type; the second power source comprises at least one battery of second type which is different from the first type; and the third power source comprises at least one battery of third type which is different from the first type and which is different from the second type.

5. The camera as claimed in claim 3, wherein the second power source comprises:
   at least one battery of first type; and
   at least one battery of second type which is different from the first type,
   wherein the third power source comprises at least one battery of third type which is different from the first type and which is different from the second type, and
   wherein the power source attachment comprises a battery compartment inside which the at least one battery of the first type, the at least one battery of the second type and the at least one battery of the third type can be selectively accommodated.

6. The camera as claimed in claim 3, wherein the power source selector is constituted by a rotary switch,
   wherein the one of the first power source, the second power source and the third power source is selected in accordance with a rotational position of the rotary switch.

7. The camera as claimed in claim 6, wherein the resetter is rotated integrally with the rotary switch.

8. The camera as claimed in claim 7, wherein the resetter outputs the reset signal to the microcomputer after the electric power is supplied to the microcomputer by operating the rotary switch, and
   wherein the resetter outputs the reset signal to the microcomputer before the electric power is stopped to be supplied to the microcomputer by the operating rotary switch.

9. A battery pack for a camera, wherein the battery pack is electrically connected to a body of the camera in which the body thereof has a first power source to supply an electric power to a microcomputer of the body, the battery pack comprising:
   a second power source;
   a power source selector for selecting one of the first power source and the second power source to supply the electric power to the microcomputer; and
   a resetter for outputting a reset signal to the microcomputer, in linkage with an operation, to select the one of the first power source and the second power source, of the power source selector.

10. The battery pack as claimed in claim 9, which further comprises a third power source, wherein the power source selector selects one of the first power source, the second power source and the third power source.

11. The battery pack as claimed in claim 10, wherein the first power source comprises at least one battery of first type; the second power source comprises at least one battery of second type which is different from the first type; and the third power source comprises at least one battery of third type which is different from the first type and which is different from the second type.

12. The battery pack as claimed in claim 10, wherein the second power source comprises:

at least one battery of first type; and at least one battery of second type which is different from the first type, wherein the third power source comprises at least one battery of third type which is different from the first type and which is different from the second type, and wherein there is provided a battery holder inside which the at least one battery of the first type, the at least one battery of the second type and the at least one battery of the third type can be selectively accommodated.

13. The battery pack as claimed in claim 9, wherein the power source selector is constituted by a rotary switch, wherein the one of the first power source and the second power source is selected in accordance with a rotational position of the rotary switch.

14. The battery pack as claimed in claim 13, wherein the resetter is rotated integrally with the rotary switch.

15. The battery pack as claimed in claim 14, wherein the resetter outputs the reset signal to the microcomputer after the electric power is supplied to the microcomputer by operating the rotary switch, and wherein the resetter outputs the reset signal to the microcomputer before the electric power is stopped to be supplied to the microcomputer by operating the rotary switch.

* * * * *